United States Patent
Doan et al.

(10) Patent No.: US 11,028,309 B2
(45) Date of Patent: Jun. 8, 2021

(54) METHOD OF USING RESIN COATED SIZED PARTICULATES AS SPACER FLUID

(71) Applicant: BAKER HUGHES OILFIELD OPERATIONS LLC, Houston, TX (US)

(72) Inventors: Angela Anh Doan, Houston, TX (US); Matthew Grady Kellum, Spring, TX (US); Shailesh Shashank Dighe, Katy, TX (US); Andrew Christopher Holley, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 78 days.

(21) Appl. No.: 16/270,982

(22) Filed: Feb. 8, 2019

(65) Prior Publication Data

US 2020/0255718 A1    Aug. 13, 2020

(51) Int. Cl.
*C09K 8/40* (2006.01)
*E21B 33/14* (2006.01)

(52) U.S. Cl.
CPC .............. *C09K 8/40* (2013.01); *E21B 33/14* (2013.01)

(58) Field of Classification Search
CPC .................................. C09K 8/40; E21B 33/14
See application file for complete search history.

(56) References Cited

U.S. PATENT DOCUMENTS

| | | |
|---|---|---|
| 2,629,667 A | 2/1953 | Kaveler |
| 3,132,693 A | 5/1964 | Weisend |
| 3,465,825 A | 9/1969 | Hook et al. |

(Continued)

FOREIGN PATENT DOCUMENTS

| | | |
|---|---|---|
| EP | 0183296 A1 | 6/1986 |
| EP | 0207536 A1 | 1/1987 |

(Continued)

OTHER PUBLICATIONS

A. Brandl, G.G. Narvaez, W.S. Bray; "New Slurry Design Concepts Using Multifunctional Additives to Improve Quality and Sustainability of Cementing Systems for Zonal Isolation"; SPE 161352; Oct. 2012; 10 pgs; Society of Petroleum Engineers; Lexington, Kentucky.

B.R. Reddy, Rahul Patil, Sandip Patil; "Chemical Modification of Biopolymers to Design Cement Slurries with Temperature-Activated Viscosification"; SPE 141005; Apr. 2011; 11pgs; Society of Petroleum Engineers; The Woodlands, Texas.

(Continued)

*Primary Examiner* — Crystal J Miller
(74) *Attorney, Agent, or Firm* — John Wilson Jones; Jones Delflache LLP (57) ABSTRACT

A cement slurry may be separated from a drilling mud in a wellbore by introducing into the wellbore an aqueous fluid having a weighting agent, a hydratable gellant powder having a particle size distribution from about 150 to about 300 mesh; and a suspension agent of particulates of a resin encapsulated hydratable polymeric viscosifying agent, the suspension agent having a particle size distribution such that at least 90% of the particulates are retained on a 20 mesh screen and 100% of the particulates are retained on a 6 mesh screen. The weighting agent may be suspended in the viscous fluid by hydrating the hydratable gellant powder. At higher temperatures and after degradation of the hydrated gellant, the weighting agent remains suspended by degrading the resin of the suspension agent and releasing the hydratable polymeric viscosifying agent into the wellbore.

20 Claims, 3 Drawing Sheets

(56) References Cited

U.S. PATENT DOCUMENTS

| | | | |
|---|---|---|---|
| 3,551,133 A | 12/1970 | Sprayberry et al. | |
| 3,974,077 A | 8/1976 | Free | |
| 4,040,967 A | 8/1977 | Nimerick et al. | |
| 4,048,077 A | 9/1977 | Englehardt et al. | |
| 4,083,407 A | 4/1978 | Griffin, Jr. et al. | |
| 4,105,461 A | 8/1978 | Racciato | |
| 4,240,840 A | 12/1980 | Downing et al. | |
| 4,304,300 A | 12/1981 | Watson | |
| 4,309,523 A | 1/1982 | Engelhardt et al. | |
| 4,480,693 A | 11/1984 | Newlove et al. | |
| 4,525,515 A | 6/1985 | Peignier | |
| 4,568,471 A | 2/1986 | Defosse | |
| 4,587,283 A | 5/1986 | Hille et al. | |
| 4,784,693 A | 11/1988 | Kirkland et al. | |
| 4,880,870 A | 11/1989 | Zimmermann | |
| 4,888,059 A | 12/1989 | Yamaguchi et al. | |
| 4,892,589 A | 1/1990 | Kirkland | |
| 4,941,536 A | 7/1990 | Brothers et al. | |
| 4,986,353 A | 1/1991 | Clark et al. | |
| 5,003,060 A | 3/1991 | Vinot | |
| 5,020,598 A | 6/1991 | Cowan et al. | |
| 5,030,366 A | 7/1991 | Wilson et al. | |
| 5,105,885 A | 4/1992 | Bray et al. | |
| 5,116,421 A | 5/1992 | Ganguli | |
| 5,184,680 A | 2/1993 | Totten et al. | |
| 5,278,203 A * | 1/1994 | Harms | C09K 3/00 106/175.1 |
| 5,372,732 A | 12/1994 | Harris et al. | |
| 5,421,881 A | 6/1995 | Rodrigues et al. | |
| 5,447,197 A | 9/1995 | Rae et al. | |
| 5,448,991 A | 9/1995 | Polson et al. | |
| 5,464,060 A | 11/1995 | Hale et al. | |
| 5,547,506 A | 8/1996 | Rae et al. | |
| 5,613,558 A | 3/1997 | Dillenbeck, III | |
| 5,658,380 A | 8/1997 | Dillenbeck, III | |
| 5,739,212 A | 4/1998 | Wutz et al. | |
| 5,795,924 A | 8/1998 | Chatterji et al. | |
| 5,866,517 A | 2/1999 | Carpenter et al. | |
| 6,145,591 A | 11/2000 | Boncan et al. | |
| 6,165,947 A | 12/2000 | Chang et al. | |
| 6,227,294 B1 | 5/2001 | Chatterji et al. | |
| 6,235,809 B1 | 5/2001 | Di Lullo Arias et al. | |
| 6,376,580 B1 | 4/2002 | Ikuta et al. | |
| 6,444,747 B1 | 9/2002 | Chen et al. | |
| 6,465,587 B1 | 10/2002 | Bair et al. | |
| 6,489,270 B1 | 12/2002 | Vollmer et al. | |
| 6,590,050 B1 | 7/2003 | Bair et al. | |
| 6,591,910 B1 | 7/2003 | Chatterji et al. | |
| 6,617,446 B1 | 9/2003 | Papadopoulos et al. | |
| 6,770,604 B2 | 8/2004 | Reddy et al. | |
| 6,832,652 B1 | 12/2004 | Dillenbeck et al. | |
| 6,869,998 B2 | 3/2005 | Bair et al. | |
| 6,907,928 B2 | 6/2005 | Di Lullo Arias et al. | |
| 6,978,835 B1 | 12/2005 | Reddy et al. | |
| 7,007,754 B2 | 3/2006 | Fanguy, Jr. et al. | |
| 7,021,380 B2 | 4/2006 | Caveny et al. | |
| 7,137,448 B2 | 11/2006 | Di Lullo Arias et al. | |
| 7,144,844 B2 | 12/2006 | Qu et al. | |
| 7,207,387 B2 | 4/2007 | Eoff et al. | |
| 7,220,709 B1 | 5/2007 | Qu et al. | |
| 7,271,214 B2 | 9/2007 | Bair et al. | |
| 7,303,018 B2 | 12/2007 | Cawiezel et al. | |
| 7,392,844 B2 | 7/2008 | Berry et al. | |
| 7,448,449 B2 | 11/2008 | Di Lullo Arias et al. | |
| 7,510,009 B2 | 1/2009 | Cawiezel et al. | |
| 7,491,682 B2 | 2/2009 | Gupta et al. | |
| 7,493,955 B2 | 2/2009 | Gupta et al. | |
| 7,598,209 B2 | 10/2009 | Kaufman et al. | |
| 7,631,541 B2 | 12/2009 | Waugh et al. | |
| 7,967,909 B2 | 6/2011 | Lopez et al. | |
| 7,977,283 B2 | 7/2011 | Gupta et al. | |
| 8,096,359 B2 | 1/2012 | Bray | |
| 8,596,356 B2 | 12/2013 | Brandl et al. | |
| 8,636,068 B2 | 1/2014 | Vorderbruggen et al. | |
| 8,664,168 B2 | 3/2014 | Steiner | |
| 8,689,870 B2 | 4/2014 | Bray et al. | |
| 9,010,430 B2 | 4/2015 | Darby et al. | |
| 9,029,300 B2 | 5/2015 | Gupta | |
| 9,102,860 B2 | 8/2015 | Cawiezel et al. | |
| 9,506,317 B2 | 11/2016 | Craig et al. | |
| 9,574,130 B2 | 2/2017 | Gupta | |
| 9,656,237 B2 | 5/2017 | Shen et al. | |
| 9,874,080 B2 | 1/2018 | Gupta | |
| 2003/0120027 A1 | 6/2003 | Valls et al. | |
| 2004/0168804 A1 | 9/2004 | Reddy et al. | |
| 2005/0009959 A1 | 1/2005 | Bair et al. | |
| 2005/0028979 A1 | 2/2005 | Brannon et al. | |
| 2005/0113264 A1 | 5/2005 | Vollmer | |
| 2005/0139130 A1 | 6/2005 | Partain, III et al. | |
| 2006/0111246 A1 | 5/2006 | Fanguy, Jr. et al. | |
| 2006/0199742 A1 | 9/2006 | Arisz et al. | |
| 2006/0205605 A1 | 9/2006 | Dessinges et al. | |
| 2006/0213662 A1 | 9/2006 | Creel et al. | |
| 2006/0254770 A1 | 11/2006 | Hou | |
| 2006/0272735 A1 | 12/2006 | Pessin et al. | |
| 2007/0135312 A1 | 6/2007 | Melbouci | |
| 2007/0015249 A1 | 7/2007 | Lin | |
| 2008/0066652 A1 | 3/2008 | Fraser et al. | |
| 2008/0066654 A1 | 3/2008 | Fraser | |
| 2008/0066655 A1 | 3/2008 | Fraser | |
| 2009/0044726 A1 | 2/2009 | Brouillette et al. | |
| 2009/0082230 A1 | 3/2009 | Javora et al. | |
| 2009/0105371 A1 * | 4/2009 | Luster-Teasley | B09C 1/08 523/124 |
| 2009/0149353 A1 | 6/2009 | Dajani et al. | |
| 2009/0156436 A1 | 6/2009 | Drochon | |
| 2010/0224366 A1 | 9/2010 | Lende et al. | |
| 2011/0053813 A1 | 3/2011 | Panga et al. | |
| 2011/0312858 A1 | 12/2011 | Holt | |
| 2012/0090841 A1 | 4/2012 | Reddy | |
| 2012/0138300 A1 | 6/2012 | Bray et al. | |
| 2012/0273197 A1 | 11/2012 | Gupta | |
| 2012/0305250 A1 * | 12/2012 | Burts, Jr. | C09K 8/424 166/292 |
| 2013/0000904 A1 | 1/2013 | Scoggins | |
| 2013/0153222 A1 | 6/2013 | Pisklak et al. | |
| 2014/0000893 A1 | 1/2014 | Lewis et al. | |
| 2014/0338915 A1 | 11/2014 | Ferm et al. | |
| 2015/0075792 A1 | 3/2015 | Brandl et al. | |
| 2015/0198010 A1 | 7/2015 | Doan et al. | |
| 2015/0204161 A1 | 7/2015 | Craig et al. | |
| 2015/0330197 A1 | 11/2015 | Brannon et al. | |
| 2016/0130495 A1 * | 5/2016 | Doan | E21B 33/14 166/292 |
| 2017/0198210 A1 | 7/2017 | Gupta | |
| 2017/0226404 A1 | 8/2017 | Gupta | |
| 2017/0350236 A1 | 12/2017 | Shen et al. | |
| 2017/0361376 A9 | 12/2017 | Murugesan et al. | |
| 2018/0072939 A9 | 3/2018 | Gupta et al. | |
| 2018/0086961 A1 * | 3/2018 | Weaver | C09K 8/90 |
| 2018/0134939 A1 | 5/2018 | Gupta et al. | |

FOREIGN PATENT DOCUMENTS

| | | | |
|---|---|---|---|
| EP | 0572261 A1 | 12/1993 | |
| EP | 0592217 A2 | 4/1994 | |
| EP | 0659702 A1 | 6/1995 | |
| EP | 1175378 B1 | 1/2002 | |
| FR | 993586 | 11/1951 | |
| WO | 1999016723 | 4/1999 | |
| WO | 2000063134 | 10/2000 | |
| WO | 2002046253 A2 | 6/2002 | |
| WO | 2003031365 A1 | 4/2003 | |
| WO | 2016154363 A1 | 9/2016 | |

OTHER PUBLICATIONS

P.A. Sandford, J. Baird, I.W. Cottrell; "Xanthan Gum with Improved Dispersibility"; Apr. 21, 1981; vol. 150; 11 pages; American Chemical Society, San Diego, CA.

Gino G. Di Lullo Arias; "Chemically Modified Polyvinyl Alcohols for Use as Cement Fluid Loss and Gas Control Additive"; Brazilian Application No. PI0904873; Apr. 19, 2011; 34 pages; Verified English Translation.

(56) References Cited

OTHER PUBLICATIONS

B.R. Reddy, "Viscosification-on-Demand: Chemical Modification of Biopolymers to Control their Activation by Triggers in Aqueous Solutions"; SPE 141007, Apr. 2011; 17 pgs; The Woodlands, Texas.
Debruijn et al. "High-Pressure, High-Temperature Technologies"; Schlumberger Oilfield Review; 2008, pp. 46-60.
A. Doan, et al., "Innovative Well Cementing Applications by Using Large Particle Sizes of Cement Additives"; SPE 176102-MS; Oct. 2015, 8 pgs., Bali, Indonesia.
International Search Report, PCT/US2020/016610—dated Apr. 5, 2020.

* cited by examiner

METHOD OF USING RESIN COATED SIZED PARTICULATES AS SPACER FLUID

FIELD OF THE DISCLOSURE

The disclosure relates to the use of a fluid containing resin coated sized particulates for separating a drilling mud from an aqueous cement slurry for use at elevated downhole temperatures.

BACKGROUND OF THE DISCLOSURE

Drilling fluids ("muds") are composed of petroleum-based or water-based materials. Such muds are normally present in wells during the cementing of a casing into the wellbore with an aqueous cement slurry. Direct contact between an aqueous cement slurry and the drilling mud often results in detrimental fluid interactions that can jeopardize not only the cementing operations but also the integrity of the wellbore.

For instance, the intermingling of such incompatible fluids can create emulsions (both water-in-oil and oil-in-water emulsions). The emulsions, which resist fluid movement upon the application of force, raise the viscosity profile of wellbore fluids. Increasing pumping head pressure to maintain a constant fluid circulation rate in the wellbore can result in damaging the formation downhole as wellbore fluid pressure exceeds the fracture gradient of the formation.

Further, the compressive strength of the set cement may be affected by weighting agents and macromolecules within the drilling mud and the slurry. The diffusion of ionic species from mud can further cause premature setting of the cement slurry. Such premature cementing setting may damage equipment and the wellbore and possible loss of the entire tubular string. Further, contamination of the cement slurry with drilling muds may undesirably increase the viscosity of the cement slurry and enhance fluid losses from the hardening slurry.

In light of the incompatibility between the drilling mud and aqueous cement slurry, it is often desirable to separate or prevent contact between them by use of a spacer fluid. In order to be effective, the spacer fluid must be compatible with the mud and the cement slurry at downhole temperatures and pressures.

Spacer fluids improve displacement of at least a portion of the drilling mud from an area in the wellbore into which the cement slurry is to be emplaced. In addition to improving displacement efficiency of the drilling mud by separating the mud from a physically incompatible fluid, spacer fluids can further enhance solids removal. Spacer fluids are also useful for separating different drilling muds during drilling mud change outs and for separating a drilling mud and an aqueous fluid (including a completion brine or seawater) during well integrity testing. In some instances, it is desirable for the spacer fluid to water-wet the surfaces of the wellbore to promote bonding of the cement sheath to the wellbore and casing.

Typically, spacer fluids contain one or more weighting agents for adjusting the density of the fluid to fit within the density profile between the displaced fluid and the cement slurry and to prevent fluid inversion. The spacer fluid introduced into the wellbore preferably has a density at least equal to or greater than the density of the drilling mud and less than or equal to the density of the cement slurry to be introduced into the wellbore. Increase in densities can be attained by the addition of the weighting agent(s).

Further, spacer fluids typically contain a viscosifying agent. The rheology and gel strength of the spacer are important for keeping the weighting agent in a suspended state under shear stresses, during pumping and at elevated temperatures and elevated pressures.

Conventional spacer fluids often do not exhibit the desired rheology at elevated downhole temperatures. For instance, conventional spacer fluids often undergo undesired thermal thinning at elevated temperatures. Further, viscosifying agents typically break down at bottom hole circulating temperatures (BHCTs) lower than often desired. As such, spacer fluids containing conventional viscosifying agents are unstable for use at a BHCT in excess of 250° F.

A need exists for spacer fluids which exhibit the requisite viscosity to withstand shear stresses during pumping of the fluid into the well as well as during the displacement of the drilling mud at elevated temperatures.

SUMMARY OF THE DISCLOSURE

In an embodiment of the disclosure, a method of separating a cement slurry from a drilling mud in a wellbore is provided wherein an aqueous fluid comprising a weighting agent, a hydratable gellant powder having a particle size distribution from about 150 to about 300 mesh and a suspension agent of particulates of a resin encapsulated hydratable polymeric viscosifying agent is introduced into the wellbore after introducing the drilling mud but before the aqueous cement slurry is introduced. The suspension agent has a particle size distribution such that at least 90% of the particulates are retained on a 20 mesh screen and 100% of the particulates are retained on a 6 mesh screen. A viscous fluid is formed by hydrating the hydratable gellant powder and suspending the weighting agent in the viscous fluid. The hydrated gellant is degraded at a bottom hole circulating temperature (BHCT) less than or equal to $T_1$. At a BHCT of $T_2$, the resin on at least 80% of the particulates of the suspension agent is degraded and the hydratable polymeric viscosifying agent has been released into the wellbore (wherein $T_2$ is greater than $T_1$) and hydrated. The weighting agent is maintained in a suspended state in the viscous fluid containing the hydrated polymeric viscosifying agent at a temperature greater than or equal to $T_2$.

In another embodiment, a method of separating a cement slurry from a drilling mud in a wellbore is provided wherein an aqueous fluid is introduced into the wellbore after introducing the drilling mud and before introducing the aqueous cement slurry. The aqueous fluid contains a weighting agent, a hydratable gellant having a particle size distribution of from about 150 to about 300 mesh; and a suspension agent of particulates of a resin encapsulated hydratable polymeric viscosifying agent. The suspension agent has a particle size distribution such that at least 90% of the particulates are retained on a 20 mesh screen and 100% of the particulates are retained on a 6 mesh screen. The weighting agent is suspended in a viscous state by hydrating the hydratable gellant. The hydrated gellant is degraded at a bottom hole circulating temperature (BHCT) less than or equal to $T_1$. While the hydrated gellant is being degraded, the weighting agent remains suspended in the fluid by the hydratable polymeric viscosifying agent which is released into the wellbore as the resin of the suspension agent is degraded. The resin is fully degraded at a temperature of $T_2$ (wherein $T_2$ is greater than $T_1$).

In another embodiment, a method of separating an aqueous cement slurry from a drilling mud in a wellbore by first introducing into the wellbore a spacer fluid; the spacer fluid being introduced into the wellbore after introducing the drilling mud but before aqueous cement slurry is introduced. The spacer fluid contains a weighting agent, a hydratable gellant having a particle size distribution from about 150 mesh to about 300 mesh and particulates of a resin encapsulated hydratable polymeric viscosifying agent having a particle size distribution such that 100% of the particulates are retained on a 6 mesh screen and at least 90% of the particulates are retained on a 20 mesh screen. A viscous fluid is formed during hydration of the hydratable gellant. The weighting agent is suspended in the viscous fluid. The hydrated gellant is fully degraded at a bottom hole circulating temperature (BHCT) of $T_1$. The weighting agent remains suspended in the viscous fluid in the hydratable polymeric viscosifying agent which is released as the resin is degraded. The resin coating which encapsulates a portion of the particulates of the suspension agent (not exceeding 20%) is degraded at a BHCT less than or equal to $T_1$. At a BHCT less than or equal to $T_2$ (wherein $T_2$ is greater than $T_1$), the resin encapsulating the hydratable polymeric viscosifying agent of at least 80% of the suspension agent is degraded. The weighting agent is maintained suspended in the viscous fluid at a bottom hole temperature in excess of $T_2$ by the released hydratable polymeric viscosifying agent.

In another embodiment, a method of separating an aqueous cement slurry from a drilling mud in a wellbore having a bottom hole circulating temperature (BHCT) greater than 300° F. is provided. In this embodiment, an aqueous spacer fluid is pumped into the wellbore after introducing the drilling mud and before introducing the aqueous cement slurry into the wellbore. The spacer fluid contains water, a weighting agent, a hydratable gellant having a particle size distribution between from about 150 mesh to about 300 mesh and particulates of a suspension agent comprising a hydratable polymeric viscosifying agent and a temperature sensitive resinous coating which encapsulates the hydratable polymeric viscosifying agent. The particle size of the particulates being such that 100% are retained on a 6 mesh screen and at least 90% of the particulates are retained on a 20 mesh screen. A viscous fluid is formed containing the weighting agent suspended therein by hydrating the hydratable gellant. The hydrated gellant is degraded at a BHCT less than or equal to $T_1$. The temperature sensitive release coating is degraded and the hydratable polymeric viscosifying agent is released into the wellbore, the coating on at least 80% of the particulates of the suspension agent being fully degraded at a BHCT of $T_2$, wherein $T_2$ is greater than $T_1$. The weighting agent is suspended in the viscous fluid at a BHCT in excess of $T_1$ with the released hydratable polymeric viscosifying agent.

In another embodiment, a method of emplacing an aqueous cement slurry into a wellbore containing a drilling mud is provided wherein an aqueous fluid is introduced into the wellbore after introduction of the drilling mud but before the aqueous cement slurry is introduced. The aqueous fluid contains water, a weighting agent and a hydratable gellant having a particle size distribution between from about 150 to about 300 mesh and particulates of a resin encapsulated hydratable polymeric viscosifying agent, the particle size distribution of the particulates being such that 100% of the particulates are retained on a 6 mesh screen and at least 90% of the particulates are retained on a 20 mesh screen. The gellant is hydrated and a viscous fluid is formed containing the hydrated gellant, weighting agent and the resin encapsulated hydratable polymeric viscosifying agent particulates. The weighting agent is suspended in the viscous fluid. The hydratable gellant is degraded at a bottom hole circulating temperature (BHCT) less than or equal to $T_1$. The resin on a portion of the particulates of the suspension agent (but no more than 20%) is degraded at a BHCT less than or equal to $T_1$ and the resin on at least 80% of the suspension agent is degraded at a temperature of $T_2$, $T_2$ being greater than $T_1$. The hydratable polymeric viscosifying agent is released into the wellbore upon degradation of the resin and the weighting agent is suspended in the released hydratable polymeric viscosifying agent. The cement slurry is then pumped into the wellbore and at least a portion of the aqueous fluid is displaced with the cement slurry. The cement slurry is then hardened.

In another embodiment, a method of separating an aqueous cement slurry from a drilling mud in a wellbore is provided wherein a spacer fluid is first pumped into the wellbore after introducing the drilling mud and before introducing the aqueous cement slurry into the wellbore. The spacer fluid contains a weighting agent; water; a hydratable gellant having a particle size distribution between from about 150 to about 300 mesh; and a suspension agent for the weighting agent. The suspension agent contains particulates of a hydratable polymeric viscosifying agent encapsulated by a resin. The particle size distribution of the suspension agent is such that 100% of the particulates are retained on a 6 mesh screen and at least 90% of the particulates are retained on a 20 mesh screen. The hydratable gellant is hydrated and forms a viscous fluid. The weighting agent is suspended in the viscous fluid along with the suspension agent. The hydrated gellant is degraded at a bottom hole circulating temperature (BHCT) less than or equal to $T_1$. The weighting agent is maintained in a suspended state (after degradation of the hydrated gellant) in the viscous fluid as the resin of the suspension agent is degraded and the hydratable polymeric viscosifying agent is released into the wellbore wherein the resin is degraded on at least 80% of the particulates of the suspension agent at a BHCT of $T_2$ ($T_2$ being greater than $T_1$). The suspended weighting agent is maintained in the viscous fluid until a BHCT of $T_3$ is attained $T_3$ being greater than $T_2$).

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Characteristics and advantages of the present disclosure and additional features and benefits will be readily apparent to those skilled in the art upon consideration of the following detailed description of exemplary embodiments of the present disclosure. It should be understood that the description herein, being of exemplary embodiments, is not intended to limit the embodiments of this patent or any patent or patent application claiming priority hereto. On the contrary, the intention is to cover all modifications, equivalents and alternatives falling within the spirit and scope of the embodiments.

Certain terms are used herein and in the appended embodiments to refer to particular components. As one skilled in the art will appreciate, different persons may refer to a component by different names. This document does not intend to distinguish between components that differ in name but not function.

The terms "including" and "comprising" are used herein and in the appended claims in an open-ended fashion, and thus should be interpreted to mean "including, but not limited to . . . ."

Further, reference herein to components and aspects in a singular tense or to the suffix(es) does not limit the present disclosure to only one such component or aspect, but should be interpreted generally to mean one or more, as may be suitable and desirable in each particular instance. As used herein, "combination" is inclusive of blends, mixtures, complexes, reaction products, and the like.

As used herein, the term "about" in reference to a given parameter is inclusive of the stated value and has the meaning dictated by the context (e.g., it includes the degree of error associated with measurement of the given parameter). Further, the term "and/or" includes any and all combinations of one or more of the associated listed items.

All ranges disclosed herein are inclusive of the endpoints and the endpoints are independently combinable with each other. A numerical range having a lower endpoint and an upper endpoint shall further encompass any number and any range falling within the lower endpoint and the upper endpoint. For example, every range of values in the form "from a to b" or "from about a to about b" or "from about a to b," "from approximately a to b," "between about a and about b," and any similar expressions, where "a" and "b" represent numerical values of degree or measurement is to be understood to set forth every number and range encompassed within the broader range of values and inclusive of the endpoints.

Further, ambient viscosity measurements were made with a Grace 3600 type viscometer with an F1 spring, B1 bob, and R1 rotor at a shear rate in $sec^{-1}$ at 77° F. (25° C.) and a pressure of 1 atmosphere. High temperature high pressure viscosity measurements were made using a HPHT Chandler 7600 using a R1 B1 cup and bob at elevated temperatures (up to 400° F.).

All references are incorporated herein by reference.

The disclosure relates to an aqueous spacer fluid having particular use at high pressure and high temperature conditions within the well.

The aqueous cement spacer contains a weighting agent, a hydratable gellant and a suspension agent. The suspension agent is a hydratable polymeric viscosifying agent encapsulated by a resinous coating. (As used herein, the term "encapsulated" to describe contact of the resinous coating onto the hydratable polymeric viscosifying agent shall include the condition wherein all surfaces of the hydratable polymeric viscosifying agent are covered by the resinous coating as well as that wherein some but not all of the surfaces of the hydratable polymeric viscosifying agent are covered by the resinous coating.)

Typically, the particle size distribution of the hydratable gellant is from about 150 to about 300 mesh. More typically, the particle size distribution of the hydratable gellant is between from about 200 to about 300 mesh.

In contrast to the hydratable gellant, the particle size distribution of the suspension agent is typically 80% greater. The hydratable polymeric viscosifying agent of the suspension agent is much coarser than the hydratable gellant. Typically, the particle size distribution of the suspension agent is such that at least 90% of the particulates are retained on a 20 mesh screen and 100% of the particulates are retained on a 6 mesh screen. In an embodiment, the resin encapsulated hydratable polymeric viscosifying agent has a particle size distribution such that at least 80% of the particulates are retained on a 30 mesh screen.

In an embodiment, the particle size distribution of the suspension agent is such that 100% of the particulates are retained on a 4 mesh screen and a minimum of 90% of the particulates are retained on a 20 mesh screen.

The amount of the hydratable gellant included in the spacer fluid is an amount sufficient to provide the desired rheological properties during pumping of the fluid into the well and up to $T_1$, as defined herein. Typically, the amount of hydratable polymeric viscosifying agent(s) employed is between from about 0.2 to about 2, preferably from about 0.6 to about 1, pounds per barrel of spacer fluid. The amount of suspension agent in the aqueous spacer fluid is typically from about 5 to about 15, more typically from about 8 to about 10, pounds per barrel of spacer fluid.

In some cases, the pH of the solution is adjusted in order for hydration to occur. For instance, the pH of the solution may be adjusted by the addition of a base, like boric acid, to attain a pH between 5.0 and 8.0. It is often unnecessary to further adjust the pH.

The density of the spacer fluid is dependent upon well conditions, most specifically, the density of the mud in the wellbore at the time of cementation. It is preferable, but not essential, that the spacer fluid introduced into the wellbore have a density at least equal to or greater than the density of the drilling mud and less than or equal to the density of the cementitious slurry to be introduced into the wellbore. The higher density spacer fluid pushes gelled and solid remnants of the displaced fluid away from the wellbore wall and fluid conduit exteriors. In an embodiment, the cement spacer may be characterized by a density ranging from about 8 to about 24 lb/gal, more preferably from about 14 to about 20 lb/gal, and most preferably about 16 to 20 lb/gal.

The weighting agent(s) increases the density of the fluid to the density profile between the fluids it is separating and to prevent fluid inversion with other fluids in the wellbore. The weighting agent assists with increasing the buoyancy effect of the spacer fluid on gelled drilling muds and filter cake. The weighting agent is employed in an amount sufficient to provide the desired density of the spacer fluid. The weighing agent is present in the spacer fluid by weight per barrel of base aqueous solution in the spacer fluid. Typically, the weighting agent is present in the spacer fluid in a range of from about 100 pounds to about 500 pounds per barrel of spacer fluid.

Weighting agents which may be utilized in the fluids are preferably insoluble in water and liquid hydrocarbons and include sand, barite, hematite, fly ash, calcium carbonate, silica sand, illmanite, manganese oxide, trimanganese tetraoxide, iron oxide, and fly ash and the like. Barite is especially preferred.

The spacer fluid is typically aqueous based. The water used in the spacer fluid may include, for example, freshwater, salt water, brine, seawater, deionized water, tap water, natural brackish water, and other potable and non-potable waters containing one or more dissolved salts, minerals or organic materials or any combination thereof. The water is included in an amount sufficient to form a pumpable fluid. In some embodiments, the water may be included in the spacer fluid in an amount in the range of about 15% to about 95% by weight of the spacer fluid. In other embodiments, the water may be included in the spacer fluid in an amount of about 25% to about 85% by weight of the spacer fluid. Typically, the amount of water in the spacer fluid is dependent on the desired density of the fluid.

The spacer fluid may be formed by blending the sized polymeric viscosifying agent(s) and hydratable gellant(s) and any of the components referenced herein into an aqueous base fluid. Blending means can include mixing using a low- or high-shear blender. Batch mixing of the components may proceed until homogeneous incorporation and formation of the space fluid is obtained. Further, the spacer fluid may be prepared on the fly.

In a preferred embodiment, the hydratable viscosifying agent is a fine powder.

Exemplary hydratable gellant(s) may be a starch or a polysaccharide like welan or xanthan, carrageenans, succinoglycan, starch and starch derivatives. In an embodiment, the hydratable viscosifying agent may be succinoglycan, locust bean gum, karaya gum, scleroglucan, diutan or a dextran.

Other suitable hydratable gellant(s) include cellulose and cellulosic derivatives including polyanionic celluloses such as hydroxyethyl cellulose, methylhydroxyethyl cellulose, carboxymethylhydroxyethyl cellulose, hydroxyethylmethyl cellulose, ethylhydroxyethyl cellulose, ethylmethylhydroxyethyl cellulose, hydroxypropyl cellulose, hydroxyethylpropyl cellulose, carboxyalkyl celluloses like carboxymethyl cellulose and carboxyethylcellulose, carboxyalkyl hydroxyalkyl celluloses like carboxymethyl hydroxyethyl cellulose (CMHEC), dialkyl carboxyalkyl celluloses like dialkyl carboxymethyl cellulose.

Other suitable hydratable gellant(s) include non-derivatized guar and derivatized guars like hydroxyalkyl guar like hydroxypropyl guar, hydroxyethyl guar and hydroxybutyl guar, carboxyalkyl hydroxyalkyl guar like carboxymethylhydroxypropyl guar, carboxyalkyl guar like carboxymethyl guar, and mixtures thereof.

Further, the hydratable gellant(s) may include clays like attapulgite, bentonite or sodium montmorillonite and mixed metal hydroxides.

Further, the hydratable gellant(s) may be a synthetic polymer like poly (methyl vinyl ether/maleic anhydride) decadiene copolymer, polyethylene oxide, homo- or copolymer, block or random polymers containing vinyl alcohol, acrylate, pyrrolidone, 2-acrylamido-2-methylpropane sulfonate, or acrylamide units and phosphomannans.

When pumped downhole, the gellant hydrates under shear and forms a viscous fluid in which is suspended the weighting agent and suspension agent. In an embodiment, the gellant suspends the weighting agent at the surface of the wellbore or concurrently with or shortly after being pumped into the wellbore and enables pumping of the weighting agent into the wellbore. Further, the rheological properties (i.e., thickening) induced by the gellant in the spacer supports suspension of the weighting agent.

A small portion of the resin coating encapsulating the hydratable viscosifying agent may degrade under shear and release the hydratable viscosifying agent into the wellbore. However, any viscosity generated by hydration of the released hydratable viscosifying agent is insufficient to suspend the weighting agent by itself. In an example, the resinous coating in no more than 3% of the suspension agent may be degraded under shear.

The weighting agent is generally kept in suspension by the hydrated gellant (without the need for hydration of the polymeric viscosifying agent) until a bottom hole circulating temperature (BHCT) is attained where the hydrated gellant begins to degrade. As used herein in reference to the hydrated gellant, the term "degrade" and "degradation" shall refer to the break down or disintegration of the gellant as a result of a chemical reaction, a thermal reaction, an enzymatic reaction, a reaction induced by radiation, etc. The term shall include the cleavage of chemical bonds, solubilization of the gellant, evaporation of the gellant or any other process in which a polymer is degraded. The BHCT at which the hydrated gel is fully degraded may be referred to as its breakdown temperature, $T_1$. Typically, the difference in BHCT at which the hydrated gellant begins to degrade and $T_1$ is between from about 5° F. to about 10° F. $T_1$ is dependent on the source of the hydratable gellant and may occur at 175° F. and is typically up to about 200° F. (e.g., xanthan) and in some cases up to about 225° F. (e.g., hydroxyalkyl celluloses, carboxyalkyl celluloses, carboxyalkyl hydroxyalkyl cellulose and dialkyl carboxyalkyl celluloses), and in other cases up to about 250° F. (e.g., galactomannan gums) and in other cases in up to about 275° F. (e.g., welan and diutan).

The hydratable polymeric viscosifying agent encapsulated by the resinous coating is released into the wellbore upon degradation of the resinous coating. The release of the hydratable polymeric viscosifying agent maintains or enhances the viscosity of the spacer fluid after $T_1$ or at the onset when degradation of the hydrated gel begins. As a result, the weighting agent remains in a suspended state in the viscous fluid; the fluid now remaining viscous by the hydrated polymeric viscosifying agent. The BHCT temperature at which the resinous coating is degraded by at least 80% is referred to as $T_2$. The weighting agent may remain in a suspended state in the viscous fluid at a temperature greater than or equal to $T_2$.

As used herein in reference to the resinous coating, the term "degrade" and "degradation" shall refer to the separation or breakdown of the resinous coating from the encapsulated gellant which may be the resultant of shear stresses or disintegration of the resinous coating such as by a chemical reaction, thermal reaction, an enzymatic reaction a reaction induced by radiation, etc. Typically, the spacer fluid is subjected to shear stresses at pumping rates from 30 to 100 rpm.

In one embodiment, $T_2$ is greater than or equal to 300° F.; in another embodiment, $T_2$ is greater than or equal to 325° F.; in another embodiment, $T_2$ is greater than or equal to 350° F.; in still another embodiment, $T_2$ is greater than or equal to 375° F.; and in another embodiment, $T_2$ is greater than or equal to 400° F.

In any event, $T_2$ is greater than $T_1$. In an embodiment, $T_2$ is at least 10° greater than $T_1$; in another embodiment, $T_2$ is at least 250 greater than $T_1$; in another embodiment $T_2$ is at least 500 greater than $T_1$; in another embodiment, $T_2$ is at least 750 greater than $T_1$; and in another embodiment, $T_2$ is at least 1000 greater than $T_1$.

In a preferred embodiment, the resin on a portion of the particulates of the suspension agent in the viscous fluid disintegrates concurrently with or shortly after the onset of degradation of the hydratable gellant (but before $T_1$). This helps maintain the viscosity of the fluid such that the viscous nature of the fluid remains unchanged when $T_1$ is attained. This ensures the weighting agent remaining continuously suspended in the fluid. Typically, before $T_1$, the resinous coating on no more than 20% of the suspension agent particulates may disintegrate.

In an embodiment, the viscosity of the fluid after $T_2$ is sufficient to maintain the weighting agent in the viscous fluid until a BHCT of $T_3$, is reached, where $T_3$ is greater than $T_2$. In an embodiment, $T_3$ is in excess of 300° F., in other cases in excess of 350° F., in other cases in excess of 400° F. and in other cases in excess of 450° F. and other cases in excess of 500° F. Thus, the polymeric viscosifying agent provides the requisite viscosity to enable particles of the weighting agent to remain suspended over a period of time and at an elevated temperature.

In some cases, $T_3$ may be at least 250 greater than $T_2$; in other cases $T_3$ is at least 50° greater than $T_2$; in other cases $T_3$ is at least 750 greater than $T_2$.

The temperature at which the polymeric viscosifying agent is released into the wellbore as well as $T_2$ is dependent on thickness of the resinous coating. The release of the resinous coating of the suspension agent, along with being dependent on the thickness of the coating of the resin on the polymeric viscosifying agent, is also dependent on the chemical constituency of the resin itself.

In a preferred embodiment, the thickness of the resin coating which encapsulates the hydratable polymeric viscosifying agent is from about 500 μm to about 2,000 μm, more typically from about 1,000 μm to about 1,500 μm. It will be understood that the coating thickness may be greater or lesser, and that amounts and types of particulate may be selected with benefit of this disclosure by those of skill in the art to meet or and withstand anticipated downhole conditions of a given application.

The coating may be applied onto the polymeric viscosifying agent in stages until the desired thickness is attained or in a single coating step.

Typically, the polymeric viscosifying agent may be any of the materials recited above for the hydratable gellant. In a preferred embodiment, the polymeric viscosifying agent is a cellulosic derivative or a galactomannan gum.

Exemplary cellulosic derivatives include hydroxyalkyl celluloses (like hydroxyethyl cellulose, methylhydroxyethyl cellulose, hydroxyethylmethyl cellulose, ethylhydroxyethyl cellulose, ethylmethylhydroxyethyl cellulose, hydroxypropyl cellulose and hydroxyethylpropyl cellulose), carboxyalkyl celluloses (like carboxymethyl cellulose and carboxyethylcellulose), carboxyalkyl hydroxyalkyl celluloses (like carboxymethylhydroxyethyl cellulose and carboxymethylhydroxyethyl cellulose), dialkyl carboxyalkyl celluloses (like dialkyl carboxymethyl celluloses) and mixtures thereof.

Exemplary galactomannans include non-derivatized guar and derivatized guars and include hydroxyalkyl guars (like hydroxypropyl guar, hydroxypropyl guar, hydroxyethyl guar and hydroxybutyl guar) carboxyalkyl guars (like carboxymethyl guar), carboxyalkyl hydroxyalkyl guars (like carboxymethyl hydroxypropyl guar and carboxymethylhydroxypropyl guar) and mixtures thereof.

Resinous coatings on the polymeric viscosifying agent include cured, partially cured, or uncured coatings of, e.g., a thermoset or thermoplastic resin.

Suitable coating materials include liquid and/or curable resins including thermosetting resins like phenolic resins like, phenol formaldehyde and melamine formaldehyde, furan resins, polyester resin, polyurethanes, epoxy resins, epoxy-modified phenolic resin, an ethyl carbamate-based resin, and derivatives thereof. And a thermoplastic resin such as polyethylene, acrylonitrile-butadiene styrene, polystyrene, polyvinyl chloride, fluoroplastics, polysulfide, polypropylene, styrene acrylonitrile, polyamides like nylon, and phenylene oxide, polycarbodiimide and polyamide imides. Mixtures of any of these materials may also be used.

Methods for coating hydratable polymeric viscosifying agents with resinous materials are known in the art. For example, the coating layer may be applied to the hydratable polymeric viscosifying agent by mixing the polymeric agent and coating material in a vessel at elevated temperatures, typically from about 200 to about 350, preferably around 250° F. Further, low temperature curing methods may be employed (e.g., using fast setting "cold set" or "cold cure" resins). Where desired, curing characteristics (e.g., curing time, etc.) may be adjusted.

The spacer fluid may contain one or more other components to secondarily supplement desirable properties of the spacer fluid. When present, the amount of any of such components may be in the range of from about 0.05% to about 1%, more typically between about 0.2 and about 0.5%, and most typically about 0.3%, by weight.

For instance, the spacer fluid may contain an antifoaming agent to prevent the formation of foams and emulsions between the aqueous and hydrocarbon-based fluids by lowering the surface tension between the materials. In particular, antifoaming agents may reduce surface tension and prevent emulsions from forming between the aqueous spacer fluid and hydrocarbons in the drilling mud and in the wellbore interior. Suitable antifoaming agents may include polysiloxanes, paraffinic oils, mineral oils, vegetable oils as well as combinations thereof.

The spacer fluid may further include a surfactant and/or solvent to enhance the chemical compatibility of the spacer fluid with the oil-based fluid and/or to control the fluidity of the spacer fluid. The surfactant may be used to water-wet both the wellbore wall and exposed surfaces in the wellbore interior by removing non-aqueous materials. This enhances the capability of the cement to adhere to the surfaces. The surfactant also interacts with hydrocarbon-coated solids to suspend them in the aqueous solution for transport out of the wellbore.

The surfactant(s) should be soluble in the spacer fluid and not precipitate. Typically, the surfactants used are water compatible surfactants.

The surfactant may be either anionic or non-ionic and is usually chosen based on the carrier of the spacer fluid as well as the wellbore fluid. Inclusive of preferred surfactants are alkanol amides, ethoxylated alkylarylsulfonates, amine oxides, ethoxylated amines, ethoxylated amides, sulfates and sulfonates of ethoxylated alcohols, ethoxylated alkyl phenols, sulfates or sulfonates of ethoxylated alkyl phenols (and their salts), ethoxylated quaternary ammonium chlorides, fluorocarbon-based surfactants, sulfates or sulfonates of alkanols, coco fatty betaines, condensation products of ethylene oxide and glycols, such as propylene glycol, sulfonated alkyl aldehyde condensates, such as sulfonated naphthalene formaldehyde condensates, sulfonated ketone/acetone formaldehyde condensates, melamine formaldehyde derivatives such as melamine formaldehyde-sodium bisulfite, sulfonated styrene maleic anhydride copolymers, polyacrylamides, such as polyacrylamide dimethylaminoethyl methacrylate copolymer, sulfonated ketone. Especially preferred are nonylphenol ethoxylates, cocoamido betaine, blends of N-alkyl coco trimethyl ammonium chloride and bis(2-hydroxyethyl)cocoamide oxide, blends of ethoxylated trimethylnonanol and perfluoro quaternary ammonium oxide, $C_{12}$-$C_{15}$ linear alcohol ethoxylated sulfate, $C_9$-$C_{11}$ linear alcohol ethoxylated sulfates, sodium lauryl sulfate and ethoxy alcohol sulfates. Preferred solvents include limonene, pinene and carotene, ketones such as acetone and ethylmethyl ketones and ethers such as ethylene glycol monobutyl ether.

Further, the spacer fluid may contain a thinning agent for reducing flow resistance and gel development by reducing viscosity of the spacer fluid. For instance, the thinning agent may reduce the flow resistance and gel development of a filter cake. Functional groups on the thinning agents may act to emulsify oils and hydrocarbons present in the aqueous phase. Thinning agents may also be used in the spacer fluid to attract solids and particles and disperse such particles; the dispersion of particles preventing any increase in viscosity of the spacer fluid due to aggregation. The thinning agent may further interact with charged particles in the wellbore fluid to suspend them for removal from the wellbore. Thinning agents, which are ionic, can further counter-act the effects of cement slurry intrusion into the aqueous spacer. (Cement intrusion in the spacer fluid composition can result in greater saline concentration or higher pH, which in turn can cause the gel strength or the yield point value, or both, of the spacer fluid to rise.) Suitable thinning agents include tannins, lignins, and humic acids, It may further be desirable to add a clay stabilizer to the storable cement spacer system. Suitable stabilizers include salts such as KCl and $NH_4Cl$, or modified salts such as those of quaternary ammonium chloride.

A wide variety of additional additives may also be included in the spacer fluid as deemed appropriate by one skilled in the art, with the benefit of this disclosure. Examples of such additives include free water control additives, fluid loss control additives, lost circulation materials, filtration control additives, dispersants, defoamers, corrosion inhibitors, scale inhibitors, formation conditioning agents, etc.

The spacer fluid defined herein is used to separate fluids in the wellbore. In this embodiment, the spacer fluid may be introduced into the wellbore having a first fluid disposed therein. A second fluid may be introduced into the wellbore with the spacer fluid separating the first fluid and the second fluid.

Typically, the spacer fluid is used to displace a first fluid (such as the drilling mud) within the wellbore. The spacer fluid positioned thus prevents negative direct interactions between incompatible fluids (such as the cement slurry) in the wellbore. The amount of spacer fluid introduced into the wellbore may displace an equivalent amount of first fluid in the wellbore. The spacer fluid induces laminar fluid circulation of the first fluid in the wellbore through the wellbore annulus. The spacer fluid typically fluidly contacts a portion of the tubular exterior surface and a portion of the wellbore wall of the annulus. The spacer fluid contacting the surfaces makes both surfaces water-wet.

In an embodiment, the drilling mud fills the interior of the wellbore as the wellbore fluid. By way of example, the spacer fluid may be used to displace at least a portion of the drilling mud from the wellbore. The spacer fluid thus may couple to the drilling mud in the wellbore.

Suitable drilling muds are petroleum-based (oil-based muds) as well as water-based materials. Examples of suitable base petroleum materials include crude oils, distilled fractions of crude oil, including diesel oil, kerosene and mineral oil, and heavy petroleum refinery liquid residues. A minor part of the oil-based mud is typically water or an aqueous solution that resides internally in the continuous petroleum phase. Oil-based muds may also include synthetic oil-based muds (typically crude oil derivatives that have been chemically treated, altered or and refined to enhance certain chemical or physical properties). Examples of synthetic oil-based muds include linear alpha olefins, isomerized olefins, poly alpha olefins, linear alkyl benzenes and vegetable and hydrocarbon-derived ester compounds.

In a preferred operation, the spacer fluid may be pumped down the wellbore and up through the annulus between the casing and the formation face to remove at least a portion of the drilling mud therefrom. The wellbore annulus forms between the external surface of the tubular (having an internal fluid conduit and an external surface) and the wellbore wall. The internal fluid conduit fluidly couples the surface with the wellbore. The water-based cement slurry then cures into a solid cement material and is isolated from the first fluid. The spacer fluid thus isolates at least a portion of the wellbore annulus in the wellbore containing the drilling mud using the aqueous cement slurry.

In an alternative operation, introduction of the spacer fluid into the wellbore may occur through a first fluid conduit. The amount of spacer fluid introduced may be at a pressure adequate to induce laminar fluid circulation in the wellbore fluid such that it displaces an equivalent amount of wellbore fluid (mud) through a second fluid conduit. The introduced spacer fluid contacts the wellbore fluid in the wellbore. Introduction of the aqueous cement slurry may occur through the first fluid conduit. The aqueous cement slurry induces laminar fluid circulation in the wellbore, contacts the spacer fluid and displaces an equivalent amount of the fluid in the wellbore. Positioning the aqueous slurry in the wellbore annulus occurs such that the cement slurry contacts both the tubular external surface and the wellbore wall. Maintaining the position of the aqueous cement slurry permits the cement to adhere to the water-wet surfaces of the wellbore wall and tubular exterior. It also permits the wellbore conditions to induce curing in the cement. Upon curing, the aqueous cement slurry forms a solid cement material in the wellbore annulus, fluidly isolating at least a portion of the wellbore annulus.

The cement slurry then may be followed by an additional volume of the spacer fluid. The spacer fluid is introduced into the wellbore in an amount sufficient to separate the drilling mud from the cement slurry. As the spacer fluid is circulated through the wellbore, it mixes with the drilling mud. Before the drilling mud is completely removed from the area to be cemented, there may be some mixing of the drilling mud, spacer fluid and cement slurry. However, the spacer fluid will not harden, gelatinize or otherwise become immobile because of the commingling of the three components.

The cement of the cement slurry may be any conventional cement used in the art in the cementing of wells. Such cements include those comprising calcium, aluminum, silicon, oxygen, iron, and/or sulfur, which set and harden by reaction with water as well as hydraulic cements such as Portland cements, pozzolan cements, gypsum cements, high alumina content cements, slag cements, silica cements as well as combinations thereof.

The spacer fluid may also remove the drilling mud, dehydrated/gelled drilling mud, and/or filter cake solids from the wellbore in advance of the cement composition. Cementing in the presence of filter cake can cause a cementing job to fail. The adhesion of filter cake and gelled fluid to the well bore wall or the tubular exterior is weak compared to the bond that cement can make. Cementing on top of filter cake strips the cake off the walls and exterior surfaces due to the weight of the cement upon curing. This lack of direct adhesion creates fluid gaps in and permits circulation through the well bore annulus. Thus, the spacer fluid defined herein may be used to remove such compositions from the wellbore and thereby enhance bonding of the cement to surfaces in the wellbore.

EXAMPLES

All percentages set forth in the Examples are given in terms of weight units except as may otherwise be indicated.

Example 1

A spacer system was formulated with 0.6 ppb of hydroxyethyl cellulose gelling agent (less than 90% retained on a 100 mesh screen), 457 ppb of weighting agent and 8 ppb of suspension agent used to prevent settling of the weighting agent. At least 90% of the particulates of the suspension agent are retained on a 20 mesh screen and 100% of the particulates are retained on a 6 mesh screen. The hydratable viscosifying agent of the suspension agent was hydroxyethyl cellulose. The suspension agent was coated with a polyepoxide resin to delay the hydration of polymer at ambient. The thickness of the coating (after two to four times application of the resin) was about 500-2000 μm was attained. The cement spacer was prepared with a density 16.69 ppg according to API RP 10B-2 standard. First the fresh water was added to the mixing container and the mixer was turned on to provide good agitation. The gelling agent was then added slowly to mix water to avoid fish eyes. The agitation was maintained and stirred for a minimum of 15 minutes. After all the gelling agent was hydrated completely, barite was added to the water and stirred for 5 minutes. The suspension agent (SA) was added to the mixed spacer for 2 minutes.

Figure 1:
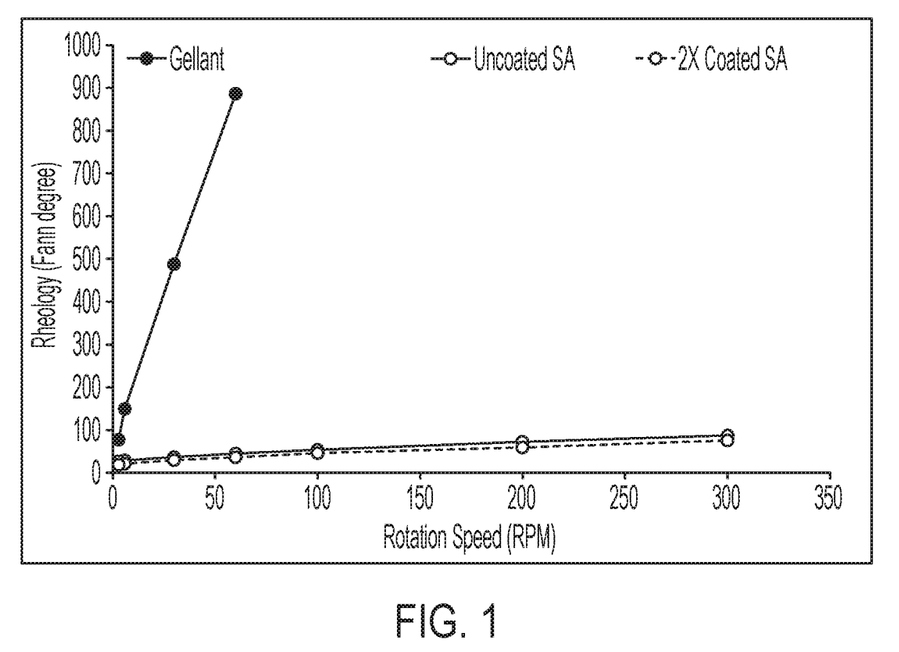
FIG. 1 illustrates the rheological properties of a spacer system defined herein immediately after being mixed.

Rheology testing was conducted at ambient and elevated temperatures measured on a Grace 3600 viscometer having a R1B1 rotor and bob assembly rotating at different speed using procedures as defined in API RP 10B-2 standard. Table I and FIG. 1 present the rheological properties immediately after mixing at ambient temperature:

TABLE I

| | Rheology (Fann degree) | | | | | | |
|---|---|---|---|---|---|---|---|
| | 300 RPM | 200 RPM | 100 RPM | 60 RPM | 30 RPM | 6 RPM | 3 RPM |
| Commercial SA | +++ | +++ | +++ | 886 | 487 | 149 | 77 |
| Uncoated SA | 87 | 72 | 53 | 45 | 36 | 29 | 27 |
| 2X Coated SA | 75 | 59 | 46 | 36 | 29 | 21 | 19 |

+++ viscosity maxed out the limit of the rheometer (spacer too thick).

The rheological properties of the spacer system after being coated two or four times with the polyepoxide coating at ambient temperature after 30 minutes is illustrated in Table II.

Figure 2:
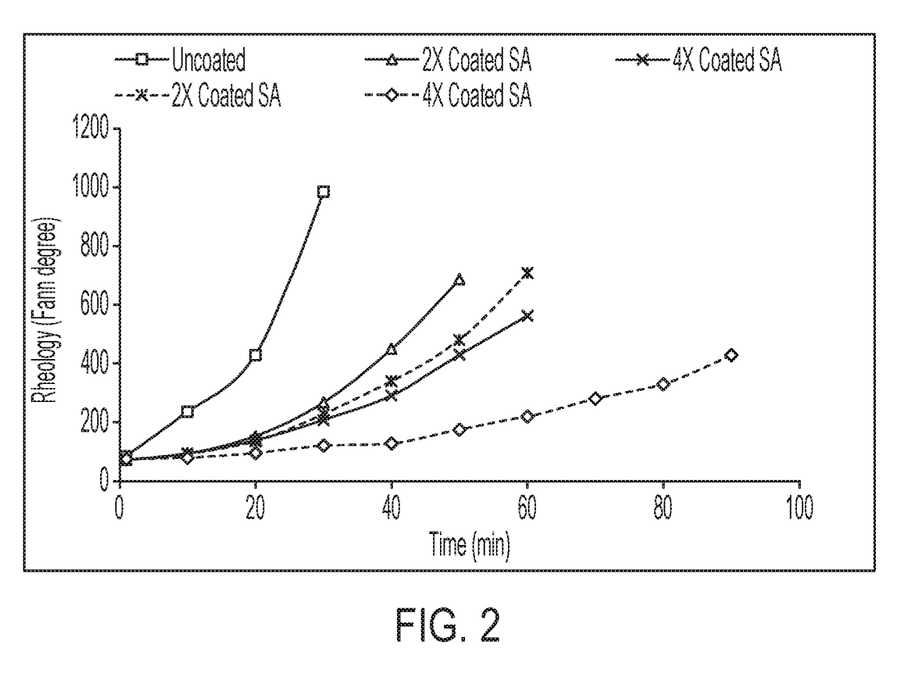
FIG. 2 illustrates the hydration at a rotational speed of 300 rpm of a spacer defined herein at ambient temperature.

FIG. 2 illustrates the time of hydration at a rotational speed of 300 rpm of the spacer system at ambient temperature.

TABLE II

| | Viscosity (Fann degree) | | | | | | |
|---|---|---|---|---|---|---|---|
| | 300 RPM | 200 RPM | 100 RPM | 60 RPM | 30 RPM | 6 RPM | 3 RPM |
| Uncoated SA | 986 | 886 | 616 | 460 | 284 | 73 | 39 |
| 2X Coated SA | 269 | 216 | 146 | 109 | 75 | 36 | 29 |
| 2X Coated SA | 229 | 180 | 123 | 92 | 65 | 35 | 28 |
| 4X Coated SA | 209 | 166 | 113 | 84 | 62 | 34 | 28 |
| 4X Coated SA | 122 | 98 | 68 | 53 | 36 | 27 | 23 |

Figure 3:
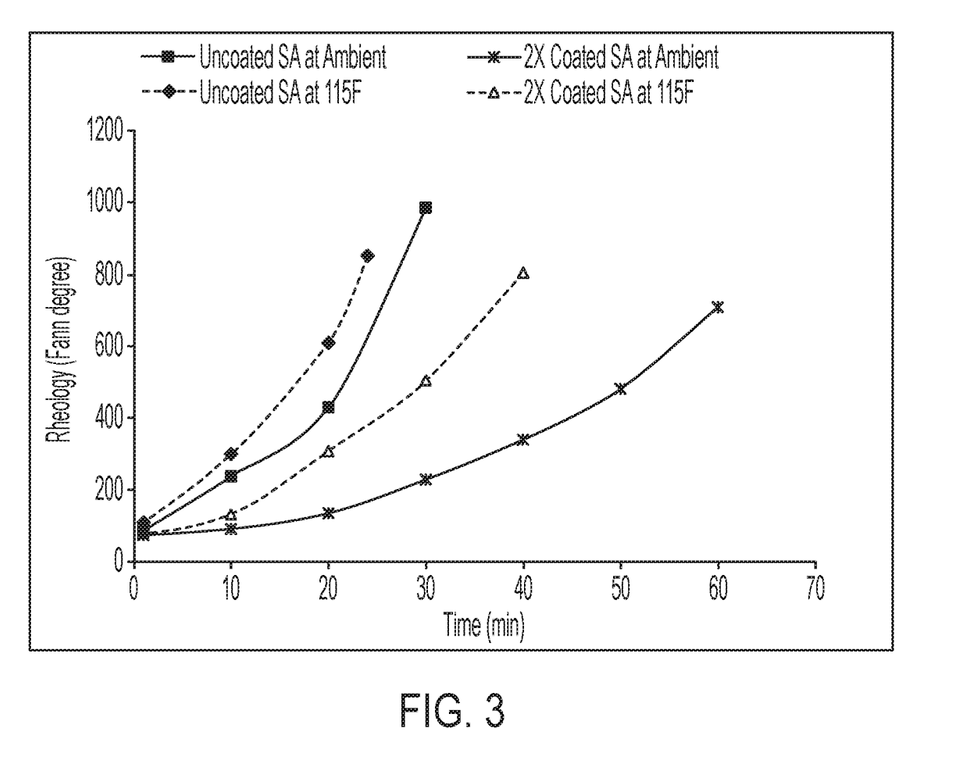
FIG. 3 illustrates the hydration at a rotational speed of 300 rpm of a spacer system defined herein at ambient temperature and at 115° F.

Table III shows the rheological properties, at 300 rpm, of the spacer system at ambient temperature and at 115° F. over time after being batch mixed. As demonstrated, the uncoated suspension agent is so viscous as to be unpumpable after 40 minutes (at ambient) and after 30 minutes (at 115° F.). In contrast, the coated suspension agent remains pumpable greater than 60 minutes (at ambient) and after 40 minutes (at 115° F.). FIG. 3 shows the time of hydration at a rotational speed of 300 rpm of the spacer system at ambient temperature and at 115° F.

TABLE III

| | Viscosity (Fann degree) | | | | | | |
|---|---|---|---|---|---|---|---|
| | 1 min | 10 mins | 20 mins | 30 mins | 40 mins | 50 mins | 60 mins |
| Uncoated SA at Ambient | 87 | 238 | 430 | 986 | +++ | +++ | +++ |
| Uncoated SA at 115° F. | 109 | 300 | 610 | +++ | +++ | +++ | +++ |
| 2X Coated SA at Ambient | 75 | 92 | 136 | 229 | 340 | 482 | 709 |
| 2X Coated SA at 115° F. | 79 | 132 | 308 | 505 | 805 | +++ | +++ |

Figure 4:
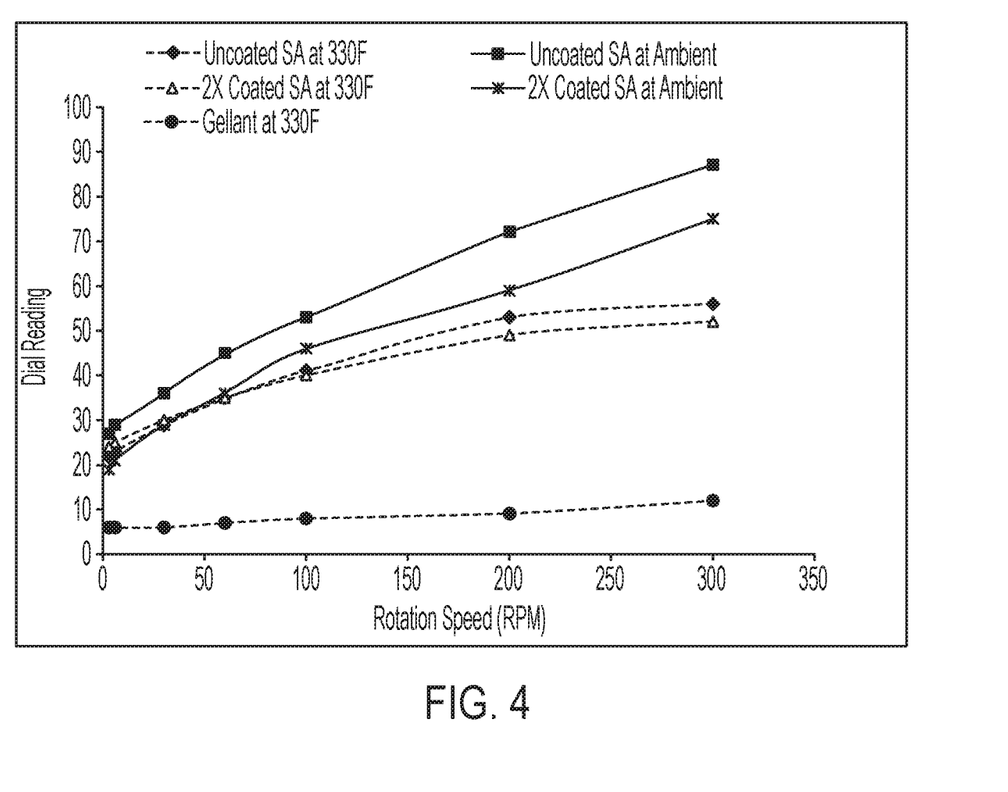
FIG. 4 illustrates the rheological properties of a spacer system defined herein at ambient temperature and at 330° F.

Table IV and FIG. 4 show the rheological properties of spacer system with different suspending material at ambient temperature and 330° F. As demonstrated, the viscosity of the spacer with the commercial suspending agent was too thick at ambient and completely fell apart at 330° F. With the coated suspending agent in spacer system, its viscosity was less than the uncoated suspension agent which means the coating will delay the hydration time of suspending agent comparing to the uncoated suspending agent. In addition, at high temperature, the spacer system with coated suspending agent still showed good rheology data as well as the uncoated suspending agent.

TABLE IV

| | Viscosity (Dial Reading) | | | | | | |
|---|---|---|---|---|---|---|---|
| | 300 RPM | 200 RPM | 100 RPM | 60 RPM | 30 RPM | 6 RPM | 3 RPM |
| Commercial SA at Ambient | +++ | +++ | +++ | 886 | 487 | 149 | 77 |
| Uncoated SA at Ambient | 87 | 72 | 53 | 45 | 36 | 29 | 27 |
| 2X Coated SA at Ambient | 75 | 59 | 46 | 36 | 29 | 21 | 19 |
| Uncoated SA at 330° F. | 56 | 53 | 41 | 35 | 29 | 23 | 22 |
| 2X Coated SA at 330° F. | 52 | 49 | 40 | 35 | 30 | 25 | 24 |
| Commercial SA at 330° F. | 12 | 9 | 8 | 7 | 6 | 6 | 6 |

Embodiment 1

A method of separating a cement slurry from a drilling mud in a wellbore the method comprising:
 (a) introducing an aqueous fluid into the wellbore, after introducing a drilling mud and before introducing the aqueous cement slurry, the aqueous fluid comprising:
  (i) a weighting agent;
  (ii) a hydratable gellant powder having a particle size distribution from about 150 to about 300 mesh; and
  (iii) a suspension agent of particulates of a resin encapsulated hydratable polymeric viscosifying agent, the suspension agent having a particle size distribution such that at least 90% of the particulates are retained on a 20 mesh screen and 100% of the particulates are retained on a 6 mesh screen;
 (b) forming a viscous fluid by hydrating the hydratable gellant powder and suspending the weighting agent in the viscous fluid;
 (c) degrading the hydrated gellant at a bottom hole circulating temperature (BHCT) less than or equal to $T_1$;
 (d) degrading the resin of the suspension agent, releasing at least 80% of the hydratable polymeric viscosifying agent into the wellbore at a BHCT of $T_2$ wherein $T_2$ is greater than $T_1$ and hydrating the hydratable polymeric viscosifying agent; and
 (e) maintaining the weighting agent in a suspended state in the viscous fluid at a temperature greater than or equal to $T_2$ with the hydrated polymeric viscosifying agent.

Embodiment 2

A method of separating a cement slurry from a drilling mud in a wellbore, the method comprising:
 (a) introducing an aqueous fluid into the wellbore, after introducing a drilling mud and before introducing the aqueous cement slurry, the aqueous fluid comprising:
  (i) a weighting agent;
  (ii) a hydratable gellant having a particle size distribution of from about 150 to about 300 mesh; and
  (iii) a suspension agent of particulates of a resin encapsulated hydratable polymeric viscosifying agent, the suspension agent having a particle size distribution such that at least 90% of the particulates are retained on a 20 mesh screen and 100% of the particulates are retained on a 6 mesh screen;
 (b) suspending the weighting agent in a viscous state by hydrating the hydratable gellant powder;
 (c) degrading the hydrated gellant at a bottom hole circulating temperature (BHCT) less than or equal to $T_1$; and
 (d) maintaining the weighting agent in a suspended state while the hydrated gellant is being degraded by releasing the encapsulated hydratable polymeric viscosifying agent into the wellbore, wherein the weighting agent is suspended in the released hydratable polymeric viscosifying agent.

Embodiment 3

A method of separating an aqueous cement slurry from a drilling mud in a wellbore, the method comprising:
 (a) introducing a spacer fluid into the wellbore, after introducing a drilling mud and before introducing the aqueous cement slurry, the spacer fluid comprising:
  (i) a weighting agent;
  (ii) a hydratable gellant having a particle size distribution from about 150 mesh to about 300 mesh; and
  (iii) particulates of a resin encapsulated hydratable polymeric viscosifying agent having a particle size distribution such 100% of the particulates are retained on a 6 mesh screen and at least 90% of the particulates are retained on a 20 mesh screen;
 (b) forming a viscous fluid comprising the weighting agent suspended therein by hydrating the hydratable gellant;
 (c) fully degrading the hydrated gellant in the viscous fluid at a bottom hole circulating temperature (BHCT) of $T_1$;
 (d) degrading a portion of the resin encapsulating the hydratable polymeric viscosifying agent at a BHCT less than or equal to $T_1$ and degrading the remainder of the resin encapsulating the hydratable polymeric viscosifying agent at a BHCT less than or equal to $T_2$, wherein $T_2$ is greater than $T_1$; and
 (e) maintaining the weighting agent suspended in the viscous fluid at a bottom hole temperature in excess of $T_2$.

Embodiment 4

A method of separating an aqueous cement slurry from a drilling mud in a wellbore having a bottom hole circulating temperature (BHCT) greater than 300° F., the method comprising:
 (a) pumping an aqueous spacer fluid into the wellbore, after introducing the drilling mud and before introducing the aqueous cement slurry into the wellbore, the spacer fluid comprising:
  (i) water;
  (ii) a weighting agent;
  (iii) a hydratable gellant having a particle size distribution between from about 150 mesh to about 300 mesh; and
  (iii) particulates of a suspension agent comprising a hydratable polymeric viscosifying agent and a temperature sensitive release coating encapsulating the hydratable polymeric viscosifying agent, the particle size of the particulates being such that 100% are retained on a 6 mesh screen and at least 90% of the particulates are retained on a 20 mesh screen;
 (b) forming a viscous fluid containing the weighting agent suspended therein by hydrating the hydratable gellant;
 (c) degrading the hydrated gellant at a BHCT less than or equal to $T_1$;
 (d) degrading the temperature sensitive release coating and releasing the hydratable polymeric viscosifying agent into the wellbore, the coating being at least 80% degraded at a BHCT of $T_2$, wherein $T_2$ is greater than $T_1$; and
 (d) suspending the weighting agent in the viscous fluid at a BHCT in excess of $T_1$ with the released hydratable polymeric viscosifying agent.

Embodiment 5

A method of emplacing an aqueous cement slurry into a wellbore containing a drilling mud, the method comprising:
 (a) introducing into the wellbore containing the drilling mud an aqueous fluid comprising
  (i) water;
  (ii) a weighting agent;
  (iii) a hydratable gellant having a particle size distribution between from about 150 to about 300 mesh; and
  (iv) particulates of a resin encapsulated hydratable polymeric viscosifying agent, the particle size distribution of the particulates being such that 100% of the particulates are retained on a 6 mesh screen and at least 90% of the particulates are retained on a 20 mesh screen;

(b) hydrating the gellant and forming a viscous fluid containing the hydrated gellant, weighting agent and the resin encapsulated hydratable polymeric viscosifying agent particulates;

(c) degrading the hydrated gellant at a bottom hole circulating temperature (BHCT) less than or equal to $T_1$;

(d) degrading no more than 20 percent of the resin encapsulating the hydratable polymeric viscosifying agent at a BHCT less than or equal to $T_1$ and degrading at least 80 percent of the resin encapsulating the hydratable polymeric viscosifying agent at a temperature of $T_2$, wherein $T_2$ is greater than $T_1$, releasing the hydratable polymeric viscosifying agent into the wellbore upon degradation of the resin and suspending the weighting agent in the released hydratable polymeric viscosifying agent;

(e) pumping the cement slurry into the wellbore and displacing at least a portion of the aqueous fluid with the cement slurry; and (f) permitting the cement slurry to harden.

Embodiment 6

A method of separating an aqueous cement slurry from a drilling mud in a wellbore, the method comprising:

(a) pumping a spacer fluid into the wellbore, after introducing the drilling mud and before introducing the aqueous cement slurry into the wellbore, the spacer fluid comprising:
 (i) a weighting agent;
 (ii) water;
 (iii) a hydratable gellant having a particle size distribution between from about 150 to about 300 mesh; and
 (iv) a suspension agent for the weighting agent, the suspension agent comprising particulates of a hydratable polymeric viscosifying agent encapsulated by a resin, wherein the particle size distribution of the suspension agent is such that 100% of the particulates are retained on a 6 mesh screen and at least 90% of the particulates are retained on a 20 mesh screen;

(b) hydrating the hydratable gellant and forming a viscous fluid comprising the hydrated gellant, the weighting agent and the suspension agent, the weighting agent being suspended in the viscous fluid;

(c) degrading the hydrated gellant at a bottom hole circulating temperature (BHCT) less than or equal to $T_1$;

(d) maintaining the weighting agent in a suspended stated after degradation of the hydrated gellant by degrading the resin of the suspension agent and releasing the hydratable polymeric viscosifying agent into the wellbore wherein the resin is at least 80% degraded at a BHCT of $T_2$, wherein $T_2$ is greater than $T_1$; and (e) maintaining the suspended weighting agent in the viscous fluid until a BHCT of $T_3$ is attained, wherein $T_3$ is greater than $T_2$.

Embodiment 7

The method of any of embodiments 1 to 6, wherein $T_2$ is greater than or equal to 300° F.

Embodiment 8

The method of any of embodiments 1 to 5, wherein the weighting agent remains suspended in the viscous fluid until the BHCT is at least 350° F.

Embodiment 9

The method of any of embodiments 1 to 8, wherein the particle size distribution of the hydratable gellant is between from about 200 to about 300 mesh.

Embodiment 10

The method of any of 1 to 9, wherein the resin encapsulated hydratable polymeric viscosifying agent has a particle size distribution such that at least 80% of the particulates are retained on a 30 mesh screen.

Embodiment 11

The method of any of embodiments 1 to 10, wherein $T_1$ is at least 275° F.

Embodiment 12

The method of any of embodiments 1 to 11, wherein $T_2$ greater than or equal to 300° F.

Embodiment 13

The method of any of embodiments 1 to 10, wherein $T_2$ is at least 25° greater than $T_1$.

Embodiment 14

The method of embodiment 13, wherein $T_2$ is at least 500 greater than $T_1$.

Embodiment 15

The method of embodiment 14, wherein $T_2$ is at least 750 greater than $T_1$.

Embodiment 16

The method of embodiment 15, wherein $T_2$ is at least 1000 greater than $T_1$.

Embodiment 17

The method of any of embodiments 6 to 16, wherein $T_3$ is at least 25° greater than $T_2$.

Embodiment 18

The method of embodiment 17, wherein $T_3$ is at least 500 greater than $T_2$.

Embodiment 19

The method of embodiment 18, wherein $T_3$ is at least 750 greater than $T_2$.

Embodiment 20

The method of any of embodiments 6 to 10, wherein $T_3$ is at least 25° greater than $T_2$.

Embodiment 21

The method of any of embodiments 1 to 20, wherein the hydratable gellant is selected from the group consisting of starch, starch derivatives, polysaccharides and mixtures thereof and wherein the particle size distribution of the dry hydratable gellant is between from about 100 mesh to about 300 mesh.

Embodiment 22

The method of any of embodiments 1 to 20, wherein the hydratable gellant is selected from the group consisting of welan, xanthan, carrageenan, succinoglycan, locust bean gum, karaya gum, scleroglucan, diutan, dextran and mixtures thereof.

Embodiment 23

The method of any of embodiments 1 to 20, wherein the hydratable gellant is selected from the group consisting of cellulose, cellulosic derivatives, galactomannans and mixtures thereof wherein the particle size distribution of the dry hydratable gellant is between from about 100 mesh to about 300 mesh.

Embodiment 24

The method of embodiment 23, wherein the hydratable gellant is selected from the group consisting of hydroxyalkyl cellulose, carboxyalkyl celluloses, carboxyalkyl hydroxyalkyl celluloses, dialkyl carboxyalkyl celluloses and mixtures thereof.

Embodiment 25

The method of embodiment 24, wherein the hydratable gellant is selected from the group consisting of hydroxyethyl cellulose, methylhydroxyethyl cellulose, carboxymethylhydroxyethyl cellulose, hydroxyethylmethyl cellulose, ethylhydroxyethyl cellulose, ethylmethylhydroxyethyl cellulose, hydroxypropyl cellulose, hydroxyethylpropyl cellulose, dialkyl carboxymethyl cellulose, carboxymethylhydroxyethyl cellulose, carboxymethyl cellulose, carboxyethylcellulose, and mixtures thereof.

Embodiment 26

The method of any of embodiments 1 to 20, wherein the hydratable gellant is non-derivatized guar, derivatized guar or a mixture thereof and wherein the particle size distribution of the dry hydratable gellant is between from about 100 mesh to about 300 mesh.

Embodiment 27

The method of embodiment 26, wherein the hydratable gellant is selected from the group consisting of hydroxyalkyl guars, carboxyalkyl guars, carboxyalkyl hydroxyalkyl guars and mixtures thereof.

Embodiment 28

The method of embodiment 27, wherein the hydratable gellant is selected from the group consisting of hydroxypropyl guar, carboxymethyl hydroxypropyl guar, carboxymethylhydroxypropyl guar. carboxymethyl guar, hydroxypropyl guar, hydroxyethyl guar, hydroxybutyl guar and mixtures thereof.

Embodiment 29

The method of any of embodiments 1 to 20, wherein the hydratable gellant is a clay.

Embodiment 30

The method of embodiment 29, wherein the clay is selected from the group consisting of attapulgite, bentonite, sodium montmorillonite and mixtures thereof.

Embodiment 31

The method of any of embodiments 1 to 20, wherein the hydratable gellant is a synthetic polymer selected from the group consisting of poly (methyl vinyl ether/maleic anhydride) decadiene copolymers, polyethylene oxide, homo-, block or random polymers containing vinyl alcohol, acrylate, pyrrolidone, 2-acrylamido-2-methylpropane sulfonate, or acrylamide units, phosphomannans or a mixture thereof.

Embodiment 32

The method of any of embodiments 1 to 20, wherein the hydratable gellant is selected from the group consisting of polyvinyl alcohol, an ammonium or alkali metal salt of an acrylamidomethylpropanesulfonic acid and mixtures thereof.

Embodiment 33

The method of any of embodiments 1 to 32, wherein the hydratable polymeric viscosifying agent is selected from the group consisting of cellulose and cellulosic derivatives.

Embodiment 34

The method of embodiment 33, wherein the hydratable polymeric viscosifying agent is selected from the group consisting of hydroxyalkyl cellulose, carboxyalkyl celluloses, carboxyalkyl hydroxyalkyl celluloses, dialkyl carboxyalkyl celluloses and mixtures thereof.

Embodiment 35

The method of embodiment 34, wherein the hydratable polymeric viscosifying agent is selected from the group consisting of hydroxyethyl cellulose, methylhydroxyethyl cellulose, carboxymethylhydroxyethyl cellulose, hydroxyethylmethyl cellulose, ethylhydroxyethyl cellulose, ethylmethylhydroxyethyl cellulose, hydroxypropyl cellulose, hydroxyethylpropyl cellulose, dialkyl carboxymethyl cellulose, carboxymethylhydroxyethyl cellulose, carboxymethyl cellulose, carboxyethylcellulose, and mixtures thereof.

Embodiment 36

The method of any of embodiments 1 to 32, wherein the hydratable polymeric viscosifying agent is non-derivatized guar, derivatized guar or a mixture thereof and wherein the particle size distribution of the dry hydratable gellant is between from about 100 mesh to about 300 mesh.

Embodiment 37

The method of embodiment 36, wherein the hydratable polymeric viscosifying agent is selected from the group consisting of hydroxyalkyl guars, carboxyalkyl guars, carboxyalkyl hydroxyalkyl guars and mixtures thereof.

Embodiment 38

The method of embodiment 37, wherein the polymeric viscosifying agent is selected from the group consisting of hydroxypropyl guar, carboxymethyl hydroxypropyl guar, carboxymethylhydroxypropyl guar. carboxymethyl guar, hydroxypropyl guar, hydroxyethyl guar, hydroxybutyl guar and mixtures thereof.

Embodiment 39

The method of any of embodiments 1 to 38, wherein the resin is a thermosetting resin, a thermoplastic resin or a combination thereof.

Embodiment 40

The method of embodiment 39, wherein the thermosetting resin is selected from the group consisting of phenolic resins, furan resins, polyester resins, polyurethanes, epoxy resins, epoxy-modified phenolic resins, ethyl carbamate-based resins and derivatives thereof and mixtures thereof.

Embodiment 41

The method of embodiment 39, wherein the thermosetting resin is a phenolic resin selected from the group consisting of phenol formaldehyde resins and melamine formaldehyde resins.

Embodiment 42

The method of embodiment 38, wherein the thermoplastic resin is selected from the group consisting of polyethylene, acrylonitrile-butadiene styrene, polystyrene, polyvinyl chloride, fluoroplastics, polysulfide, polypropylene, styrene acrylonitrile, polyamides, phenylene oxide, polycarbodiimide, polyamide imide resins and mixtures thereof.

Embodiment 43

The method of any of embodiments 1 to 42, wherein the thickness of the resin coating encapsulating the hydratable polymeric viscosifying agent is from about 500µ to about 2,000µ.

Embodiment 44

The method of any of embodiments 1 to 43, wherein the weighting agent is selected from the group consisting of sand, barite, hematite, fly ash, calcium carbonate, silica sand, illmanite, manganese oxide, trimanganese tetraoxide, iron oxide and mixtures thereof.

Embodiment 45

The spacer fluid of embodiment 44, wherein the weighting agent is barite.

What is claimed is:

1. A method of separating an aqueous cement slurry from a drilling mud in a wellbore, the method comprising:
   (a) introducing a spacer fluid into the wellbore, after introducing the drilling mud and before introducing the aqueous cement slurry, the spacer fluid comprising:
      (i) a weighting agent;
      (ii) a hydratable gellant having a particle size distribution from about 150 mesh to about 300 mesh; and
      (iii) particulates of a resin encapsulated hydratable polymeric viscosifying agent having a particle size distribution such that 100% of the particulates are retained on a 6 mesh screen and at least 90% of the particulates are retained on a 20 mesh screen;
   (b) forming a viscous fluid comprising the weighting agent suspended therein by hydrating the hydratable gellant;
   (c) degrading the hydrated gellant in the viscous fluid at a bottom hole circulating temperature (BHCT); the BHCT being less than or equal to $T_1$, wherein $T_1$ is at least 175° F.;
   (d) degrading no more than 20% of the resin encapsulating the hydratable polymeric viscosifying agent at a BHCT less than or equal to $T_1$ and degrading at least 80% of the resin encapsulating the hydratable polymeric viscosifying agent at a BHCT less than or equal to $T_2$, wherein $T_2$ is greater than $T_1$; and
   (e) maintaining the weighting agent suspended in the viscous fluid at a bottom hole temperature in excess of $T_2$.

2. The method of claim 1, wherein $T_2$ is greater than or equal to 300° F.

3. The method of claim 1, wherein the weighting agent remains suspended in the viscous fluid until the BHCT is at least 350° F.

4. The method of claim 1, wherein the resin encapsulated hydratable polymeric viscosifying agent has a particle size distribution such that at least 80% of the particulates are retained on a 30 mesh screen.

5. The method of claim 1, wherein $T_1$ is at least 275° F.

6. The method of claim 1, wherein $T_2$ is at least 25° greater than $T_1$.

7. The method of claim 1, wherein the hydratable gellant is selected from the group consisting of starch, starch derivatives, polysaccharides, clay, poly (methyl vinyl ether/maleic anhydride) decadiene copolymers, polyethylene oxide, homo-, block or random polymers containing vinyl alcohol, acrylate, pyrrolidone, 2-acrylamido-2-methylpropane sulfonate, or acrylamide units, phosphomannans, polyvinyl alcohol, an ammonium or alkali metal salt of an acrylamidomethylpropanesulfonic acid and mixtures thereof.

8. The method of claim 1, wherein the hydratable polymeric viscosifying agent is selected from the group consisting of cellulose, cellulosic derivatives, non-derivatized guar, derivatized guar and mixtures thereof.

9. The method of claim 1, wherein the resin is a thermosetting resin, a thermoplastic resin or a combination thereof.

10. The method of claim 9, wherein the thermosetting resin is selected from the group consisting of phenolic resins, furan resins, polyester resins, polyurethanes, epoxy resins, epoxy-modified phenolic resins, ethyl carbamate-based resins and derivatives thereof and mixtures thereof.

11. The method of claim 1, wherein the thickness of the resin coating encapsulating the hydratable polymeric viscosifying agent is from about 500 μm to about 2,000 μm.

12. The method of claim 1, wherein all of the resin is degraded at a BHCT less than or equal to $T_2$.

13. A method of emplacing an aqueous cement slurry into a wellbore containing a drilling mud, the method comprising:
   (a) introducing into the wellbore containing the drilling mud an aqueous fluid comprising:
      (i) water;
      (ii) a weighting agent;
      (iii) a hydratable gellant having a particle size distribution between from about 150 mesh to about 300 mesh; and
      (iv) particulates of a resin encapsulated hydratable polymeric viscosifying agent, the particle size distribution of the particulates being such that 100% of the particulates are retained on a 6 mesh screen and at least 90% of the particulates are retained on a 20 mesh screen;
   (b) hydrating the gellant and forming a viscous fluid containing the hydrated gellant, weighting agent and the resin encapsulated hydratable polymeric viscosifying agent particulates;
   (c) degrading the hydrated gellant at a bottom hole circulating temperature (BHCT) less than or equal to $T_1$, wherein $T_1$ is at least 175° F.;
   (d) degrading no more than 20% of the resin encapsulating the hydratable polymeric viscosifying agent at a BHCT less than or equal to $T_1$ and degrading at least 80% of the resin encapsulating the hydratable polymeric viscosifying agent at a temperature of $T_2$, wherein $T_2$ is greater than $T_1$, releasing the hydratable polymeric viscosifying agent into the wellbore upon degradation of the resin and suspending the weighting agent in the released hydratable polymeric viscosifying agent;
   (e) pumping the cement slurry into the wellbore and displacing at least a portion of the aqueous fluid with the cement slurry; and
   (f) permitting the cement slurry to harden.

14. The method of claim 13, wherein the BHCT of the wellbore is greater than or equal to 300° F.

15. The method of claim 13, wherein $T_2$ is at least 25° greater than $T_1$.

16. A method of separating an aqueous cement slurry from a drilling mud in a wellbore, the method comprising:
   (a) pumping a spacer fluid into the wellbore, after introducing the drilling mud and before introducing the aqueous cement slurry into the wellbore, the spacer fluid comprising:
      (i) a weighting agent;
      (ii) water;
      (iii) a hydratable gellant having a particle size distribution between from about 150 mesh to about 300 mesh; and
      (iv) a suspension agent for the weighting agent, the suspension agent comprising particulates of a hydratable polymeric viscosifying agent encapsulated by a resin, wherein the particle size distribution of the suspension agent is such that 100% of the particulates are retained on a 6 mesh screen and at least 90% of the particulates are retained on a 20 mesh screen;
   (b) hydrating the hydratable gellant and forming a viscous fluid comprising the hydrated gellant, the weighting agent and the suspension agent, the weighting agent being suspended in the viscous fluid;
   (c) degrading the hydrated gellant and no more than 20% of the resin encapsulating the hydratable polymeric viscosifying agent at a bottom hole circulating temperature (BHCT) less than or equal to $T_1$, wherein $T_1$ is at least 175° F.;
   (d) maintaining the weighting agent in a suspended stated after degradation of the hydrated gellant by degrading the resin of the suspension agent and releasing the hydratable polymeric viscosifying agent into the wellbore wherein the resin is at least 80% degraded at a BHCT of $T_2$, wherein $T_2$ is greater than $T_1$; and
   (e) maintaining the suspended weighting agent in the viscous fluid until a BHCT of $T_3$ is attained, wherein $T_3$ is greater than $T_2$.

17. The method of claim 16, wherein $T_2$ is at least 25° greater than $T_1$.

18. The method of claim 16, wherein $T_3$ is at least 25° greater than $T_2$.

19. The method of claim 18, wherein $T_2$ is at least 25° greater than $T_1$.

20. The method of claim 16, wherein:
   (a) the hydratable gellant is selected from the group consisting of starch, starch derivatives, polysaccharides, clay, poly (methyl vinyl ether/maleic anhydride) decadiene copolymers, polyethylene oxide, homo-, block or random polymers containing vinyl alcohol, acrylate, pyrrolidone, 2-acrylamido-2-methylpropane sulfonate, or acrylamide units, phosphomannans, polyvinyl alcohol, an ammonium or alkali metal salt of an acrylamidomethylpropanesulfonic acid and mixtures thereof;
   (b) the hydratable polymeric viscosifying agent is selected from the group consisting of cellulose, cellulosic derivatives, non-derivatized guar, derivatized guar and mixtures thereof; and
   (c) the resin is a thermosetting resin, a thermoplastic resin or a combination thereof.

* * * * *